United States Patent [19]
Cox, Jr. et al.

[11] Patent Number: 5,508,999
[45] Date of Patent: Apr. 16, 1996

[54] METHOD AND SYSTEM FOR DESIGNING LEAST COST LOCAL ACCESS NETWORKS

[75] Inventors: Louis A. Cox, Jr., Denver; Yuping Qiu, Louisville; George E. Tegan, Lakewood; Xiaorong Sun, Boulder, all of Colo.

[73] Assignee: U S WEST Advanced Technologies, Inc., Boulder, Colo.

[21] Appl. No.: 131,045

[22] Filed: Oct. 1, 1993

Related U.S. Application Data

[63] Continuation-in-part of Ser. No. 944,515, Sep. 10, 1992, abandoned, which is a continuation-in-part of Ser. No. 520,676, May 8, 1990, abandoned.

[51] Int. Cl.$^6$ .................................... H04L 12/28
[52] U.S. Cl. ............... 370/17; 370/58.1; 370/60
[58] Field of Search ................ 370/13, 17, 60, 370/60.1, 94.1, 94.2, 85.13, 85.14, 85.15, 58.1, 58.2, 58.3

[56] References Cited

U.S. PATENT DOCUMENTS 5,270,919 12/1993 Blake et al. ..................... 370/60.1

*Primary Examiner*—Wellington Chin
*Attorney, Agent, or Firm*—Brooks & Kushman

[57] ABSTRACT

A method and system is provided for use in cooperation with a computer having a memory for generating an optimized transition plan for the placement and interconnection of carrier hubs in a local access network having a plurality of Central Offices (COs), Serving Wire Centers (SWCs) and Point-of-Presence (POP) exchange carriers such that calls may be routed at least cost. In operation, the total number and location of existing SWCs within the network must be determined along with the total switched and special access demand. Thereafter, known tariff rates for selected channel terminals, transport channels and multiplexers must be determined along with the total number of DS3 lines from each SWC to its corresponding POP. By expressing determined network demand as selected mixed-integer program decision variables and determining a corresponding set of logical constraints consistent with these decision variables, the optimized placement of hubs within the local access network may be determined. In addition, the corresponding location and type of channel terminals, transport channels and multiplexers may be implemented all accordance with the mixed-integer program and an electrical signal corresponding thereto may be generated for receipt by the computer memory. This information may thereafter be retrieved from computer memory and graphically displayed on a user-friendly interface.

6 Claims, 3 Drawing Sheets

5,508,999

METHOD AND SYSTEM FOR DESIGNING LEAST COST LOCAL ACCESS NETWORKS

Cross-Reference To Related Application

This application is a continuation-in-part of U.S. patent application Ser. No. 07/944,515, filed Sep. 10, 1992, now abandoned, which, in turn, is a continuation-in-part of U.S. patent application Ser. No. 07/520,676, filed May. 8, 1990, now abandoned.

TECHNICAL FIELD

This invention relates generally to local access networks and, more particularly, to a method and system for generating an optimized transition plan for the conceptual placement and interconnection of carrier hubs such that calls may be routed within the network at least cost.

BACKGROUND ART

Typical local access networks, i.e., those designed for communication within Local Access Transport Areas (LATAs), consist of links between several customer sites and corresponding central offices. These central offices, in turn, are linked to Serving Wire Centers (SWCs) which are provided in electrical or optical communication with Point-Of-Presence (POP) exchange carriers. POPs provide long distance services to customers within the local access network. As those skilled in the art are aware, the Regional Bell Operating Companies (RBOCs) are required by Federal law to lease the above local access lines to long distance carriers in accordance with predetermined tariff rates. These tariff rates are compiled in known tariff tables and, in the first instance, are based on the type of equipment utilized. There are two types of demand which must be considered when making a determination as to the type of network components to be utilized in a local access network. There is switch-access demand which is generally reserved for residential customers wherein tariff charges are calculated based upon the number of required lines, the specific components utilized and the actual Minutes Of Usage (MOU). Similarly, there is special-access demand, which is generally reserved for higher volume business customers who pay a monthly flat rate without regard to the actual minutes of usage. In both cases, however, the tariff rates are tied to the specific components utilized and the distance of call travel based upon vertical (V) and horizontal (H) coordinates.

As those skilled in the art will recognize, as transport channels increase in traffic capacity, the applicable tariff rates decrease. Thus, carrier "hubs" as they have become known in the art, have become increasingly popular for multiplexing a plurality of lower capacity transport channels originating from corresponding central offices to one or more Serving Wire Centers via higher capacity transport channels. If such carrier hubs are placed appropriately, the multiple tariff charges from the increased number of components will still provide a significant savings over costly point-to-point connections between central offices and Serving Wire Centers.

With this knowledge, those skilled in the art have thus turned their attention toward the determination of the most economic placement of carrier hubs and the type and location of interconnections therebetween in order to develop optimized transition plans for the placement of such hubs. Today, such planning has required hundreds of hours of time and related iterations.

General methods and systems for allocating resources in telecommunication facilities are known generally in the art. As disclosed, for example, by U.S. Pat. No. 4,744,028 to Karmarkar. This patent discloses a method and system for allocating available telecommunication transmission facilities among subscribers demanding service at a particular time. An objective of the method and system is to reduce the total operation cost of the transmission facilities.

In the method and system disclosed by Karmarkar, subscribers and total cost are linearly related. The method and system tentatively and iteratively assign telecommunication transmission facilities to customers, determining each reassignment by normalizing a previous assignment in view of allocation constraints. These reiterative steps are terminated when the cost is found to be less than a threshold value, and an allocation and transmission facilities is made accordingly. A similar method is disclosed in U.S. Pat. No. 4,744,026 to Vanderbei. This patent discloses a method for allocating available industrial facilities among users thereof and has an objective of reducing the total costs for providing the facilities. In the disclosed method, available facilities are tentatively and iteratively assigned to users according to an algorithm to reduce costs.

As in the case of Karmarkar, the method disclosed in Vanderbei requires that each reassignment be determined by normalizing a previous assignment in view of allocation constraints. During each reassignment, changes with respect to a previous assignment are adjusted, in terms of their direction, under the assumption that at least one constraint increases in value without limit. The reiterative steps are terminated when the cost if found to be less than a threshold value, and an allocation of transmission facilities is made according to the final, reduced-cost assignment.

While each of the above disclosed methods for allocating communication resources functions with a certain degree of efficiency, none disclose the advantages of the disclosed method and system for designing and implementing least cost local access networks.

Disclosure Of The Invention

It is a principal object of the present invention to provide a method and system for determining the placement and interconnection of carrier hubs within a local access network.

A more specific object of the present invention is the provision of a method for generating an optimized plan for the placement and interconnection of carrier hubs within a local access network based upon projected customer demand and component availability such that calls may be routed therein at least cost.

In realizing the aforementioned and other objects, the method and system for planning the placement and interconnection of carrier hubs within a local access network uses a mixed-integer program representing a multi-period problem based upon demand forecasts. This program is implemented in a suitable language such as "C" and run on a computer having sufficient memory such as a SUNSPARC station. Using operation costs as well as installation costs, the problem is solved for each of a specific number of individual periods, each solution representing a lowest cost communication network for an isolated period.

The foregoing are accomplished by defining a geographic area to be serviced by the communication network, and defining, within that area, geographic locations of switching offices to be included in the network. The number of contiguously sequential periods for which a communication network topology is to be designed is also defined. Tariff and geographic data relating to the switching offices and potential customer demand projection data associated with the area to be serviced by the communication network during the periods are obtained.

The installation and operation costs of voice-grade circuits and digital circuits used to link each office within the area during a specific period are calculated as a function of the tariff and geographic data. The numbers of voice-grade circuits and digital circuits required to link each office within the area during the specific period are calculated as a function of the potential base data and the customer demand projection data.

A lowest-cost network configuration within the area during the specific period is then determined as a function of the operation costs and of the numbers of voice-grade circuits and digital circuits required to link each office within the area during a specific period. Using the obtained data, the foregoing calculations and determinations are repeated until a lowest-cost network configuration has been determined for each of the periods.

In carrying out the specific object of the present invention, the method and system for generating an optimized plan for the placement and interconnection of carrier hubs requires the initial determinations of the total and location of existing Serving Wire Centers within the network as well as the total switched-access and special-access network demand. Tariff rates for selected channel terminals, transport channels and multiplexers must also be determined along with the total number of existing DS3 lines from each Serving Wire Center to its corresponding POP. Once this information is obtained, the projected customer demand may be expressed as selected mixed integer program decision variables which must be solved in accordance with a corresponding set of logical constraints consistent with these decision variables. Thereafter, the placement of conceptual carrier hubs and the corresponding location and type of channel terminals, transport channels and multiplexers may be implemented for billing purposes in accordance with the mixed integer program and a corresponding electrical signal will be generated for receipt by the computer memory. This information may be retrieved and graphically displayed on a user-friendly interface in a format which may be recognized by the user.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein.

BEST MODE FOR CARRYING OUT THE INVENTION

Figure 1:
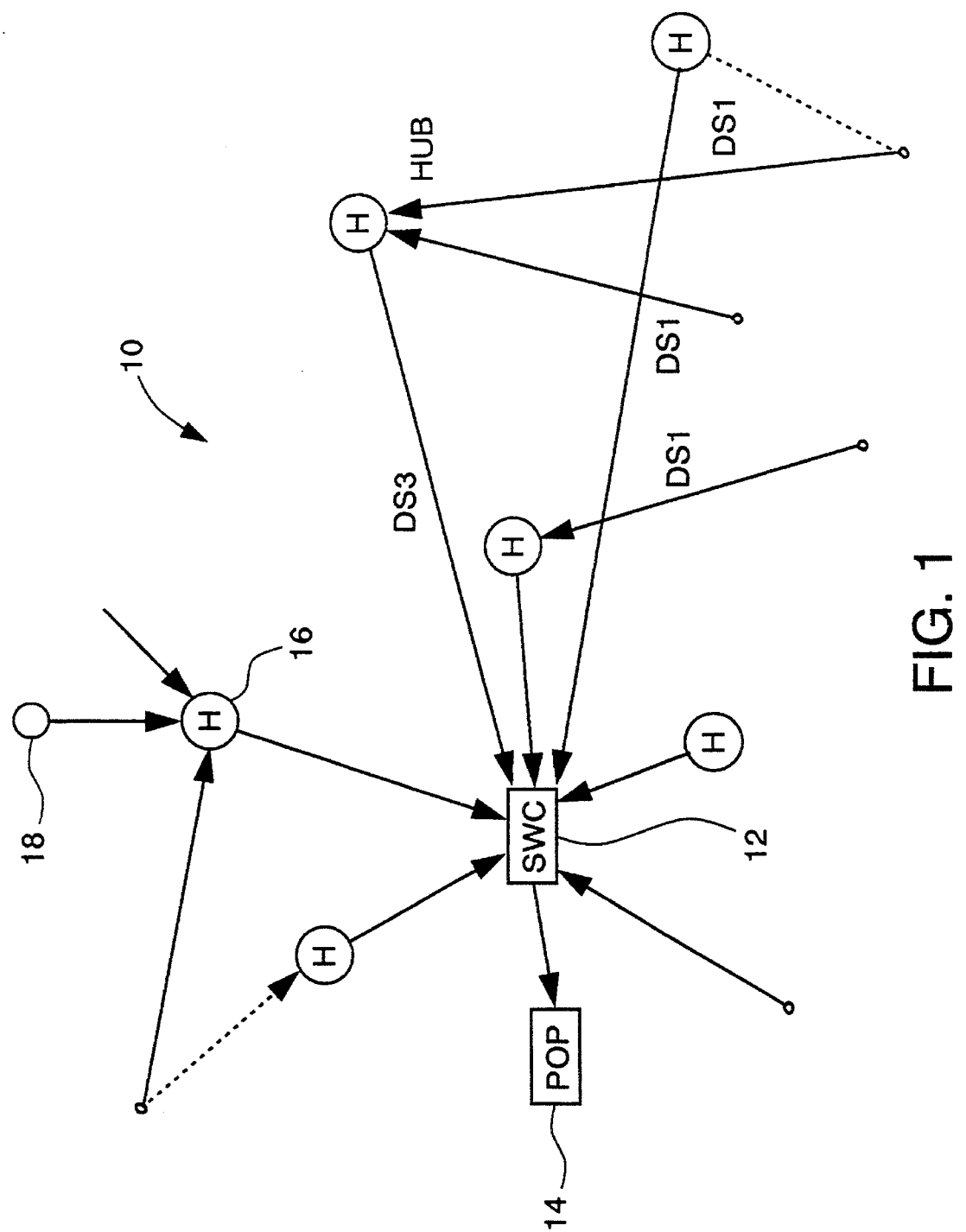
FIG. 1 is a schematic representation of a typical local access network.

With reference to FIG. 1 of the drawings, there is shown a schematic representation of a typical local access network incorporating the carrier "hubs", implementation of which the method and system of the present invention is directed to. As shown, local access network 10 includes a Serving Wire Center (SWC) 12 provided in electrical or optical communication with a Point-Of-Presence (POP) exchange carrier 14. There is further shown a plurality of carrier hubs 16 which are provided in electrical or optical communication with a like plurality of central offices 18. Carrier hubs 16 are similarly provided in electrical or optical communication with Serving Wire Center 12.

Figure 2:
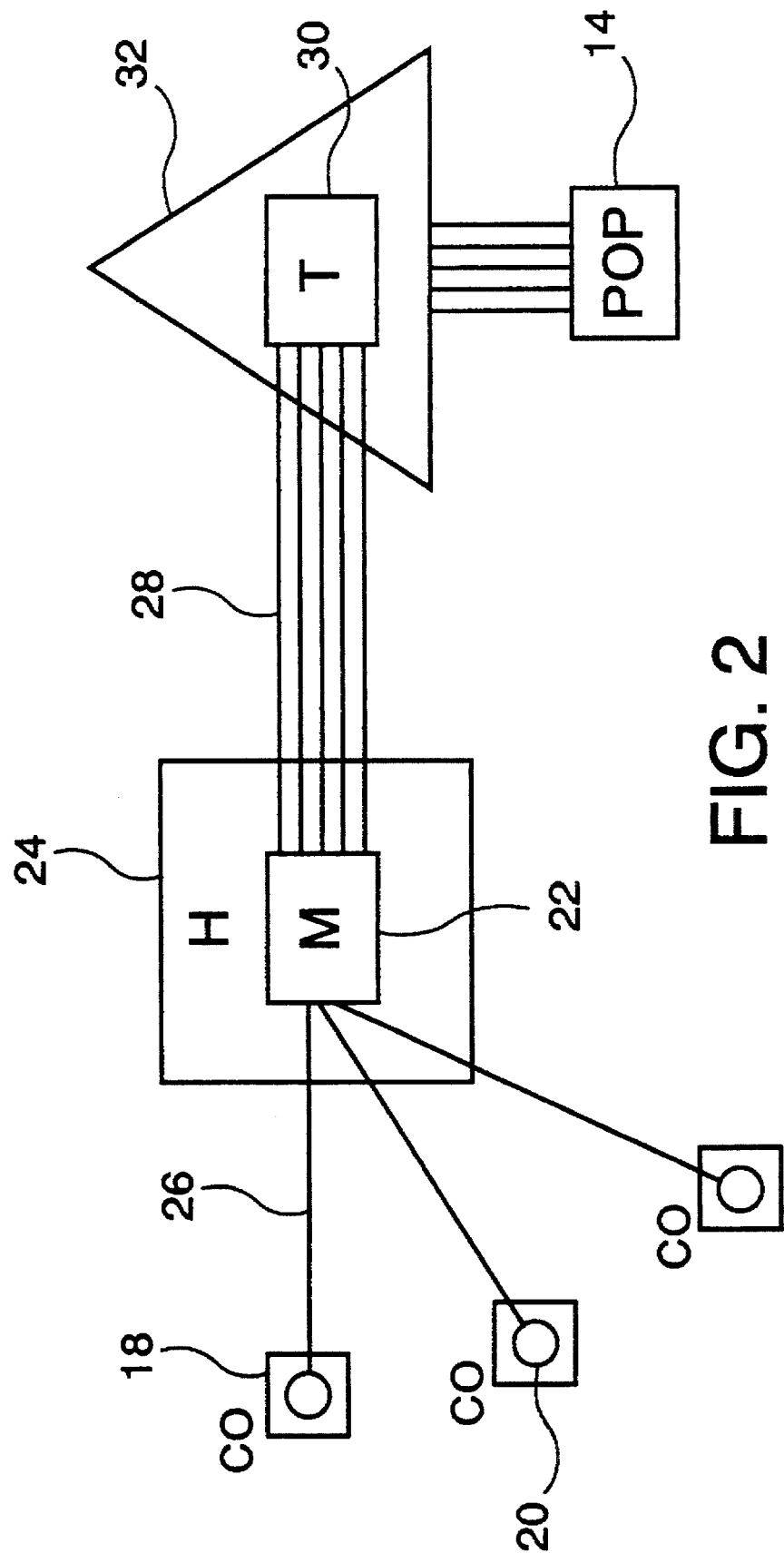
FIG. 2 is a schematic representation of the component interconnections of the local access network of FIG. 1.
Figure 3:
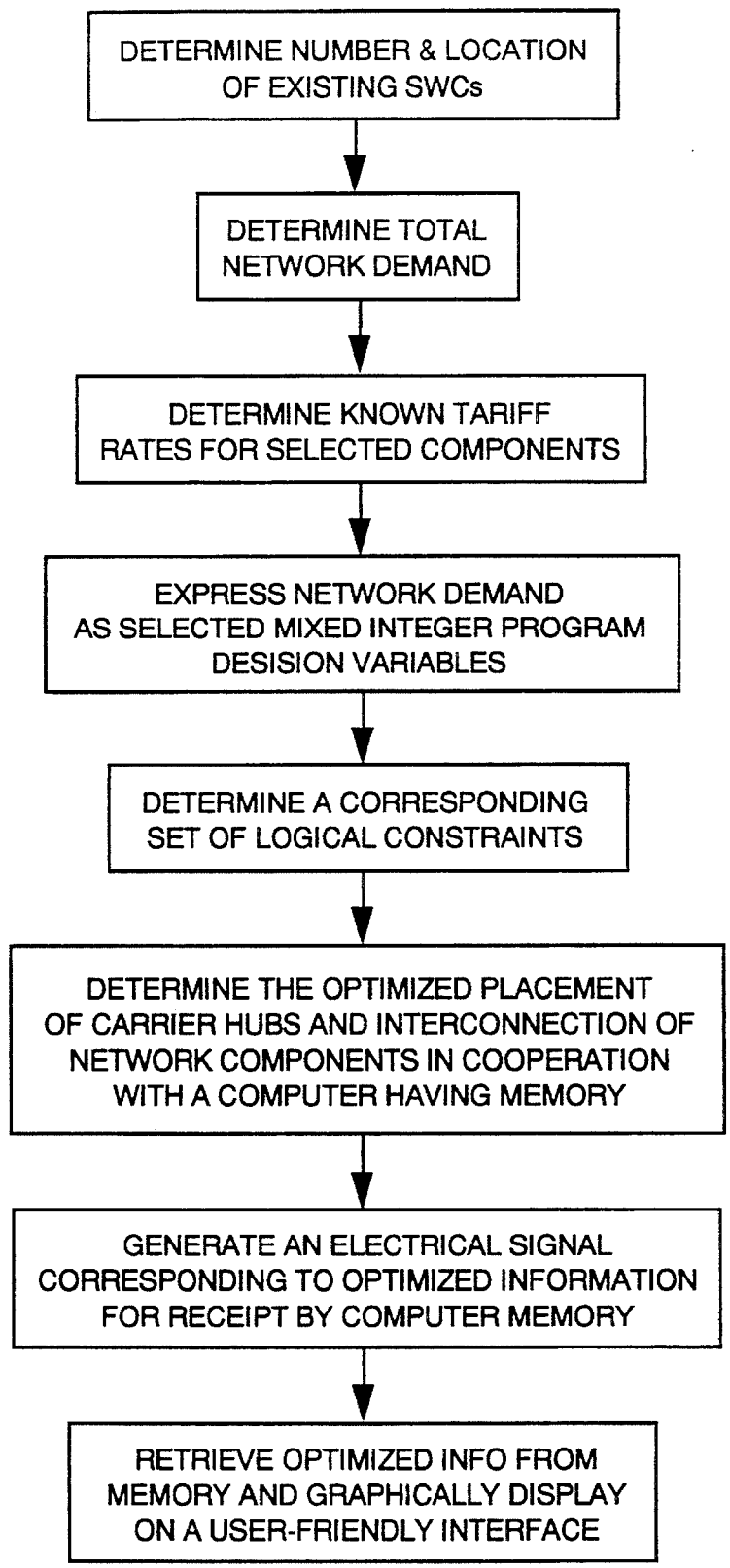
FIG. 3 is a block diagram illustrating the steps involved in the method of the present invention for planning the conceptual placement and interconnection of carrier hubs within a local access network.

Turning now to FIG. 2 of the drawings, there is shown a schematic representation of the individual component interconnections of the local access network of FIG. 1. As seen, central offices 18 are shown under normal circumstances incorporating DS1 terminals 20 which are provided in electrical or optical communication with a multiplexer 22 at a carrier hub 24 via DS1 transport channels 26. DS1 lines 26 are multiplexed to the higher capacity DS3 transport channel 28 where they are provided in electrical or optical communication with a DS3 terminal 30 at Serving Wire Center 32. SWC 32 is further provided in electrical or optical communication with POP 14 via a corresponding DS3 transport channel 34.

With an understanding of the above architecture, the method and system of the present invention for planning the placement and interconnection of carrier hubs within a local access network utilizes a mixed-integer program in cooperation with a computer memory having sufficient memory for modeling a multi-period problem based upon customer demand and component availability forecasts. In operation, the method and system of the present invention requires the initial determination of existing Servicing Wire Centers 12 within the network under review as well as the total switched-access and special-access network demand. Reference must further be made to known tariff rates for selected channel terminals, transport channels and multiplexers. such as the DS1 and DS3 components referenced above, along with the total number of existing network lines and, in particular, DS3 lines from each Serving Wire Center to its corresponding POP. Once this information is obtained, projected customer demand over a selected time period may be expressed as selected mixed-integer program decision variables such as provided below. These variables may thereafter be solved in accordance with corresponding logical constraints such as the following in cooperation with a computer, as referenced above:

$$Z^* = \min \sum_{i \in N_o} \sum_{j \in H} b_{ij} x_{ij} + b_{j_o j_o} p_{j_o} + \sum_{j \in H} c_j u_j + \sum_{k=1}^{m} e_k v_k -$$

$$\sum_{j \in H_o} \sum_{i \in N_j} \frac{1}{28} c_j w_i z_i + \frac{1}{28} c_{jo} \sum_{j \in H_o} \sum_{i \in N_j} w_i (1 - z_i) -$$

$$\frac{1}{28} c_{jo} \sum_{i \in N} w_i$$

subject to $$\sum_{j \in H} x_{ij} = p_i, i \in N_o$$

$$\sum_{j \in H_o} y_{ij} \leq 1, i \in N_o$$

$$x_{ij} \leq p_i y_{ij}, i \in N_o, j \in H_o$$

$$\sum_{i \in N_o} x_{ij} + \sum_{i \in N_j} w_i z_i \leq 28 u_j, j \in H_o$$

-continued $$\sum_{i \in N_o} x_{ij_o} + \sum_{i \in N} w_i + p_{jo} - \sum_{j \in H_o} \sum_{i \in N_j} z \Sigma \, iw_i \leq 28 u_{jo}$$

$$\sum_{j \in H} u_j - \sum_{k=1}^{m} kv_k = 0$$

$$\sum_{k=1}^{m} v_k = 1$$

$$y_{jj} \leq 1 \quad j \in H_o$$

$$y_{ij} \leq y_{jj} \quad i \in N_o, j \in H_o, i \neq j$$

$$z_i \leq y_{jj}, i \in N_j, j \in H_o$$

$$\left\lfloor \frac{1}{28} \left( \sum_{k \in N_{jo}} w_k + p_{jo} \right) \right\rfloor + 1 - z_i \leq u_{jo}, i \in N_j, j \in H_o$$

$$u_j \geq \alpha_j, \, J \in H$$

$u_j$ nonnegative integers
$y_{ij}, z_j, v_k$ binary
$x_{ij} \geq o$ $$\text{Total cost} = z^* - \left( \sum_{i \in N} w_i \sum_{k=1}^{m} v_k e_k \right) / \left( 28 \sum_{k=1}^{m} kv_k \right)$$

Variables:

| | |
|---|---|
| $x_{ij}$: | number of DS1's from node $i \in N_o$ to hub $j \in H_o$; nonnegative continuous variables (should be integer in the final solution) |
| $y_{ij}$: | $Y_{ij} = 1$ iff $x_{ij} > 0$, for $j \in N_o$, $i \in H_o$; binary variables; |
| $u_j$: | number of DS3's at hub $j \in H$; nonnegative integer variables; |
| $z_i$: | $z_i = 0$ iff the switch demand $w_i > 0$ at $i \in N_j$, $j \in H_o$; |
| | : is rearranged directly to the main office; binary variables; |
| $v_k$: | $v_k = 1$ iff the total number of DS3's is equal to k. |

Parameters:

| | |
|---|---|
| N: | set of serving wire centers; $N = \{1, 2, \ldots, n\}$, |
| $j_o$: | the main office |
| $n_o$: | $= N - \{j_o\}$ |
| $N_j$: | $= \{i \in N |$ switched demand from node $i$ is currently homed to hub $j$ and $w_i > 0\}$ |
| H: | set of existing and potential hubs |
| $H_o$: | $= H - \{j_o\}$ |
| $p_i$: | special DS1 demand at node $i \in N$ |
| $w_i$: | switched DS1 demand at node $i \in N$ |
| $b_{ij}$: | (DS1 chan-term cost) + (DS1 transport channel cost from i to j) |
| $c_j$: | (DS1–DS3 Mux cost) + (DS3 transport channel cost from j to $j_o$) |
| $e_k$: | (cost of k DS3 chan-term) + k(DS3 transport channel cost from $j_o$ to POP) |
| l: | lower bound on the total number of DS3's |
| m: | upper bound on the total number of DS3's |
| $\alpha_j$: | lower bound of on the number of DS3's at hub j |

$$\alpha_{jo} = \left\lceil \frac{1}{28} \left( p_{jo} + \sum_{i \in N_{jo}} w_i \right) \right\rceil.$$

For $j \neq j_o$, $$\alpha_j = \begin{cases} 1 (p_j \geq q_j) & \text{if } p_j < 28 \\ \left\lfloor \frac{p_j}{28} \right\rfloor = 1 \left( p_j - 28 \left\lfloor \frac{p_j}{28} \right\rfloor \geq \tilde{q}_j \right), & \text{if } p_j \geq 28 \end{cases}$$

$$q_j = \left\lceil \frac{c_j + (DS3 \text{ channel term cost})}{\min_{k \neq j, k \in H} b_{jk}} \right\rceil.$$

$$\tilde{q}_j = \left\lceil \frac{c_j + (DS3 \text{ channel term cost})}{b_{jjo}} \right\rceil.$$

Utilizing the above mixed-integer program, an electrical signal may be generated for receipt by the appropriate computer memory corresponding to an optimized determination of the placement of carrier hubs as well as the corresponding location and type of channel terminals, transport channels and multiplexers. This information may thereafter be retrieved from the computer memory and schematically displayed in a user-friendly interface for review by the user.

While the best mode for carrying out the invention has been described in detail, those familiar with the art to which this invention relates will recognize various alternative designs and embodiments for practicing the invention as defined by the following claims.

What is claimed is:

1. For use in cooperation with a computer having memory, a method of placing and interconnecting carrier hubs in a local access network having a plurality of Central Offices (COs), Serving Wire Centers (SWCs) and Point-of-Presence (POP) exchange carriers such that calls may be routed at least cost, comprising:

determining a total number and location of existing SWCs in said network;

determining a total switched and special access network demand;

determining known tariff rates for selected channel terminals, transport channels and multiplexers;

determining a total number of DS3 lines from each SWC to its corresponding POP;

expressing said determined total switched and special access network demand as selected mixed-integer program decision variables;

determining a corresponding set of logical constraints consistent with said decision variables;

determining an optimized plan for the placement of said carrier hubs, including corresponding locations and types of channel terminals, transport channels and multiplexers;

generating an electrical signal for receipt by said computer memory corresponding to said optimized plan;

converting said optimized plan to optimized data;

storing said optimized data in the memory of the computer; and implementing the placement and interconnecting of the carrier hubs in the local access network in accordance with said stored optimized data so that calls may be routed with least cost.

2. The method of claim 1 further comprising retrieving said optimized data from said memory and generating a supplemental electrical signal corresponding thereto for receipt by a user-friendly interface;

converting said optimized data in memory of the computer to graphic data; and displaying said optimized plan on a user-friendly interface in response to said graphic data.

3. The method of claim 1, wherein said total switched and special access network demand is expressed as $$Z^* = \min \sum_{i \in N_o} \sum_{j \in H} b_{ij} x_{ij} + b_{jojo} p_{jo} + \sum_{j \in H} c_j u_j + \sum_{k=1}^{m} e_k v_k -$$

$$\sum_{j \in H_o} \sum_{i \in N_j} \frac{1}{28} c^j w_i z_i + \frac{1}{28} c^{j_o} \sum_{j \in H_o} \sum_{i \in N_j} w_i (1 - z_i) -$$

$$\frac{1}{28} c_{j_o} \sum_{i \in N} w_i$$

said logical constraints are $$\sum_{j \in H} x_{ij} = p_i, \; i \in N_o$$

$$\sum_{j \in H_o} y_{ij} \leq 1, \; i \in N_o$$

$$x_{ij} \leq p_i y_{ij}, \; i \in N_o, \; j \in H_o$$

$$\sum_{i \in N_o} x_{ij} + \sum_{i \in N_j} w_i z_i \leq 28 u_j, \; j \in H_o$$

$$\sum_{i \in N_o} x_{ij_o} + \sum_{i \in N} w_i + p_{j_o} - \sum_{j \in H_o} \sum_{i \in N_j} z \Sigma \, i w_i \leq 28 u_{j_o}$$

$$\sum_{j \in H} u_j - \sum_{k=1}^{m} k v_k = 0$$

$$\sum_{k=1}^{m} v_k = 1$$

$$y_{jj} \leq 1 \quad j \in H_o$$

$$y_{ij} \leq y_{jj} \quad i \in N_o, j \in H_o, i\_j$$

$$z_i \leq y_{jj}, \; i \in N_j, j \in H_o$$

$$\left\lfloor \frac{1}{28} \left( \sum_{k \in N_{j_o}} w_k + p_{j_o} \right) \right\rfloor + 1 - z_i \leq u_{j_o}, \; i \in N_j, j \in H_o$$

$u_j \geq \alpha_j, \; J \in H$
$u_j$ nonnegative integers
$y_{ij}, z_j, v_k$ binary
$x_{ij} \geq 0$ $$\text{Total cost} = z^* - \left( \sum_{i \in N} w_i \sum_{k=1}^{m} v_k e_k \right) / \left( 28 \sum_{k=1}^{m} k v_k \right)$$

and said decision variables are $x_{ij}$: number of DS1's from node $i \in N_o$ to hub $j \in H_o$; nonnegative continuous variables (should be integer in the final solution)
$y_{ij}$: $Y_{ij} = 1$ iff $x_{ij} > 0$, for $j \in N_o$, $i \in H_o$; binary variables;
$u_j$: number of DS3's at hub $j \in H$; nonnegative integer variables;
$z_i$: $z_i = 0$ iff the switch demand $w_i > 0$ at $i \in N_j$, $j \in H_o$;
: is rearranged directly to the main office; binary variables;
$v_k$: $v_k = 1$ iff the total number of DS3's is equal to k.

N: set of serving wire centers; $N = \{1, 2, \ldots, n\}$,
$j_o$: the main office
$n_o$: $= N - \{j_o\}$
$N_j$: $= \{i \in N |$ switched demand from node i is currently homed to hub j and $w_i > 0\}$
H: set of existing and potential hubs
$H_o$: $= H - \{j_o\}$
$p_i$: special DS1 demand at node $i \in N$
$w_i$: switched DS1 demand at node $i \in N$
$b_{ij}$: (DS1 chan-term cost) + (DS1 transport channel cost from i to j)
$c_j$: (DS1–DS3 Mux cost) + (DS3 transport channel cost from j to $j_o$)
$e_k$: (cost of k DS3 chan-term) + k(DS3 transport channel cost from $j_o$ to POP)
l: lower bound on the total number of DS3's
m: upper bound on the total number of DS3's
$\alpha_j$: lower bound of on the number of DS3's at hub j $$\alpha_{j_o} = \left\lceil \frac{1}{28} \left( p_{j_o} + \sum_{i \in N_{j_o}} w_i \right) \right\rceil.$$

For $j \neq j_o$, $$\alpha_j = \begin{cases} 1 (p_j \geq q_j) & \text{if } p_j < 28 \\ \left\lfloor \frac{p_j}{28} \right\rfloor = 1 \left( p_j - 28 \left\lfloor \frac{p_j}{28} \right\rfloor \geq \bar{q}_j \right), & \text{if } p_j \geq 28 \end{cases}$$

$$q_j = \left\lceil \frac{c_j + (DS3 \text{ channel term cost})}{\min_{k\_j, k \in H} b_{jk}} \right\rceil.$$

$$\bar{q}_j = \left\lceil \frac{c_j + (DS3 \text{ channel term cost})}{b_{jj_o}} \right\rceil.$$

4. For use in cooperation with a computer having memory, a system for placing and interconnecting carrier hubs in a local access network having a plurality of Central Offices (COs), Serving Wire Centers (SWCs) and Point-of-Presence (POP) exchange carriers such that calls may be routed at least cost, comprising:

means for determining total number and location of existing SWCs in said network;

means for determining a total switched and special access network demand;

means for determining known tariff rates for selected channel terminals, transport channels and multiplexers;

means for determining a total number of DS3 lines from each SWC to its corresponding POP;

means for expressing said determined total switched and special access network demand as selected mixed-integer program decision variables;

means for determining a corresponding set of logical constraints consistent with said decision variables;

means for determining an optimized plan for the placement of said carrier hubs, including corresponding locations and types of channel terminals, transport channels and multiplexers;

means for generating an electrical signal for receipt by said computer memory corresponding to said optimized plan;

means for converting said optimized plan to optimized data which may be stored in the memory of the computer; and means for implementing the placement and interconnecting of the carrier hubs in the local access network in accordance with said stored optimized data so that calls may be routed with least cost.

5. The system of claim 3 further comprising means for retrieving from memory said optimized data from said memory and generating a supplemental electrical signal corresponding thereto for receipt by a user-friendly interface; and means for converting said optimized data in memory of the computer to graphic data; and means for displaying said optimized plan on a user-friendly interface in response to said graphic data.

6. The system of claim 3, wherein said total switched and special access network demand is expressed as $$Z^* = \min \sum_{i \in N_o} \sum_{j \in H} b_{ij}x_{ij} + b_{j_oj_o}p_{j_o} + \sum_{j \in H} c_j u_j + \sum_{k=1}^{m} e_k v_k -$$

$$\sum_{j \in H_o} \sum_{i \in N_j} \frac{1}{28} c^j w_i z_i + \frac{1}{28} c^{j_o} \sum_{j \in H_o} \sum_{i \in N_j} w_i(1-z_i) -$$

$$\frac{1}{28} c_{j_o} \sum_{i \in N} w_i$$

said logical constraints are $$\sum_{j \in H} x_{ij} = p_i, \; i \in N_o$$

$$\sum_{j \in H_o} y_{ij} \leq 1, \; i \in N_o$$

$$x_{ij} \leq p_i y_{ij}, \; i \in N_o, j \in H_o$$

$$\sum_{i \in N_o} x_{ij} + \sum_{i \in N_j} w_i z_i \leq 28 u_j, \; j \in H_o$$

$$\sum_{i \in N_o} x_{ij_o} + \sum_{i \in N} w_i + p_{j_o} - \sum_{j \in H_o} \sum_{i \in N_j} z \Sigma \, i w_i \leq 28 u_{j_o}$$

$$\sum_{j \in H} u_j - \sum_{k=1}^{m} k v_k = 0$$

$$\sum_{k=1}^{m} v_k = 1$$

$$y_{jj} \leq 1 \quad j \in H_o$$

$$y_{ij} \leq y_{jj} \quad i \in N_o, j \in H_o, i\_j$$

$$z_i \leq y_{jj}, \; i \in N_j, j \in H_o$$

$$\left\lfloor \frac{1}{28} \left( \sum_{k \in N_{j_o}} w_k + p_{j_o} \right) \right\rfloor + 1 - z_i \leq u_{j_o}, \; i \in N_j, j \in H_o$$

$u_j \geq \alpha_j, \; J \in H$
$u_j$ nonnegative integers
$y_{ij}, z_j, v_k$ binary
$x_{ij} \geq o$ $$\text{Total cost} = z^* - \left( \sum_{i \in N} w_i \sum_{k=1}^{m} v_k e_k \right) / \left( 28 \sum_{k=1}^{m} k v_k \right)$$

and said decision variables are $x_{ij}$: number of DS1's from node $i \in N_o$ to hub $j \in H_o$; nonnegative continuous variables (should be integer in the final solution)
$y_{ij}$: $Y_{ij} = 1$ iff $x_{ij} > 0$, for $j \in N_o$, $i \in H_o$; binary variables;
$u_j$: number of DS3's at hub $j \in H$; nonnegative integer variables;
$z_i$: $z_i = 0$ iff the switch demand $w_i > 0$ at $i \in N_j$, $j \in H_o$;
 : is rearranged directly to the main office; binary variables;
$v_k$: $v_k = 1$ iff the total number of DS3's is equal to k.

N: set of serving wire centers; $N = \{1, 2, \ldots, n\}$,
$j_o$: the main office
$n_o$: $= N - \{j_o\}$
$N_j$: $= \{i \in N |$ switched demand from node i is currently homed to hub j and $w_i > 0\}$
H: set of existing and potential hubs
$H_o$: $= H - \{j_o\}$
$p_i$: special DS1 demand at node $i \in N$
$w_i$: switched DS1 demand at node $i \in N$
$b_{ij}$: (DS1 chan-term cost) + (DS1 transport channel cost from i to j)
$c_j$: (DS1–DS3 Mux cost) + (DS3 transport channel cost from j to $j_o$)
$e_k$: (cost of k DS3 chan-term) + k(DS3 transport channel cost from $j_o$ to POP)
l: lower bound on the total number of DS3's
m: upper bound on the total number of DS3's
$\alpha_j$: lower bound of on the number of DS3's at hub j $$\alpha_{j_o} = \left\lceil \frac{1}{28} \left( p_{j_o} + \sum_{i \in N_{j_o}} w_i \right) \right\rceil.$$

$$\alpha_j = \begin{cases} 1(p_j \geq q_j) & \text{if } p_j < 28 \\ \left\lfloor \frac{p_j}{28} \right\rfloor = 1 \left( p_j - 28 \left\lfloor \frac{p_j}{28} \right\rfloor \geq \tilde{q}_j \right), & \text{if } p_j \geq 28 \end{cases}$$

$$q_j = \left\lceil \frac{c_j + (DS3 \text{ channel term cost})}{\min_{k\_j, k \in H} b_{jk}} \right\rceil.$$

$$\tilde{q}_j = \left\lceil \frac{c_j + (DS3 \text{ channel term cost})}{b_{jj_o}} \right\rceil.$$

* * * * *